United States Patent
Blanke et al.

(10) Patent No.: US 10,427,105 B2
(45) Date of Patent: Oct. 1, 2019

(54) FILTER DEVICE

(71) Applicants: Nanostone Water GmbH, Halberstadt (DE); Nanostone Water Inc., Eden Prairie, MN (US)

(72) Inventors: Thomas Blanke, Harsleben (DE); Bernd Koecher, Wegeleben (DE); Daniel Ahlers, Quedlinburg (DE); Dagmar Wolff, Ditfurt (DE); Christopher James Kurth, Eden Prairie, MN (US); Christian Goebbert, Eschau (DE)

(73) Assignee: Nanostone Water Inc., Waltham, MA (US)

( * ) Notice: Subject to any disclaimer, the term of this patent is extended or adjusted under 35 U.S.C. 154(b) by 183 days.

(21) Appl. No.: 15/511,574

(22) PCT Filed: Sep. 15, 2015

(86) PCT No.: PCT/EP2015/071089
§ 371 (c)(1),
(2) Date: Mar. 15, 2017

(87) PCT Pub. No.: WO2016/041956
PCT Pub. Date: Mar. 24, 2016

(65) Prior Publication Data
US 2017/0259215 A1    Sep. 14, 2017

(30) Foreign Application Priority Data

Sep. 15, 2014 (DE) .......... 10 2014 218 416

(51) Int. Cl.
*B01D 71/02* (2006.01)
*B01D 65/00* (2006.01)
(Continued)

(52) U.S. Cl.
CPC .......... *B01D 71/02* (2013.01); *B01D 63/061* (2013.01); *B01D 63/065* (2013.01);
(Continued)

(58) Field of Classification Search
CPC .... B01D 71/02; B01D 63/065; B01D 63/066; B01D 63/081; B01D 63/082;
(Continued)

(56) References Cited

U.S. PATENT DOCUMENTS

| 2006/0163142 A1 | 7/2006 | Nonninger et al. |
| 2009/0236295 A1 | 9/2009 | Braun et al. |
| 2011/0198278 A1* | 8/2011 | Gabriel ............... B01D 63/061 210/321.84 |

FOREIGN PATENT DOCUMENTS

| CN | 1054110 C | 7/2000 |
| DE | 19807769 A1 | 8/1999 |

(Continued)

OTHER PUBLICATIONS

Patent Cooperation Treaty, International Searching Authority, Search Report and Written Opinion for PCT/US2015/050238, 18 pages, dated Mar. 21, 2016.

(Continued)

*Primary Examiner* — Madeline Gonzalez
(74) *Attorney, Agent, or Firm* — Fish & Richardson P.C.

(57) ABSTRACT

The invention relates to a filter device (10) serving to filter a liquid, in particular for treating water. The filter device comprises: at least two plate-shaped filter elements (12) and at least one holding element (20) for filter elements (12). According to the invention, the holding element (20) comprises a holding frame (22), a grout material (26), and an end unit (24), which is separate from the holding frame (22), wherein the grout material (26) is arranged between the filter elements (12) and the holding frame (22), such that the grout (Continued)

material seals the filter elements (12) against the holding frame (22), that the end unit (24) is fastened on the holding frame (22) in a liquid-tight manner, and that the holding frame (22) and the end unit (24) delimit a liquid collection chamber (40).

20 Claims, 6 Drawing Sheets

(51) Int. Cl.
*B01D 63/06* (2006.01)
*C02F 1/44* (2006.01)
*B01D 63/08* (2006.01)

(52) U.S. Cl.
CPC ......... *B01D 63/066* (2013.01); *B01D 63/081* (2013.01); *B01D 63/082* (2013.01); *B01D 65/003* (2013.01); *B01D 71/024* (2013.01); *C02F 1/44* (2013.01); *B01D 2313/04* (2013.01); *B01D 2313/125* (2013.01); *B01D 2313/21* (2013.01); *B01D 2313/54* (2013.01)

(58) Field of Classification Search
CPC .. B01D 63/061; B01D 71/024; B01D 65/003; B01D 2313/125; B01D 2313/21; B01D 2313/54; B01D 2313/04; C02F 1/44
USPC .. 210/323.1, 252, 253, 262, 321.61, 321.75, 210/321.85
See application file for complete search history.

(56) References Cited

FOREIGN PATENT DOCUMENTS

| DE | 19819676 A1 | 11/1999 |
|----|----|----|
| DE | 102006022502 A1 | 11/2007 |
| DE | 102008036920 A1 | 2/2010 |
| EP | 1442782 A1 | 8/2004 |
| EP | 2561922 A1 | 2/2013 |
| JP | H04247223 A | 9/1992 |
| JP | 5403156 B2 | 1/2014 |
| JP | 2014014736 A | 1/2014 |
| WO | 2004071620 A1 | 8/2004 |
| WO | 2011033537 A1 | 3/2011 |
| WO | 2011148768 A1 | 12/2011 |
| WO | 2013079392 A1 | 6/2013 |
| WO | WO2016/041956 | 3/2016 |

OTHER PUBLICATIONS

Written Opinion and International Search Report in corresponding PCT Application No. PCT/EP2015/071089, dated Aug. 1, 2016, pp. 1-10.

* cited by examiner

FILTER DEVICE

RELATED APPLICATIONS

This application claims priority to German Application No. 10 2014 218 416.9, that was filed Sep. 15, 2014.

The invention relates to a filter device for filtration of fluid media, according to the preamble of claim 1.

DE 19819676 A1 describes the fabrication of so-called "ceramic flat membrane elements" with an exterior side which has filter activity, and with interiorly disposed discharge channels. For treatment of wastewater, these elements are arranged into modules. The modules are immersed in the liquid which is to be purified, and the impurities can be retained by applying an underpressure to the filter elements, with the purified water being directed away through the interior channels.

In DE 19807769 B4, DE 10 2006 022502 A1, and DE 10 2008 036920 A1, various types of filter devices are described. The first two documents describe different filter devices which are very costly to fabricate and which require each individual element to be separately sealed. The seals involved often lead to major problems and leaks, because the filter elements cannot always be produced in an accurate and properly fitting manner, given that they shrink during the sintering process which is involved. The third publication describes overall casting of a flat membrane assembly. The membrane holding means and the collection chamber for the permeate are fabricated as a single unit structure. The major drawback of this is that if a given element has a defect or breakage it is necessary to replace and dispose of the entire module comprised of 35 filter elements (ca. 5 square meters of filter surface). Also, single-piece casting is a very costly procedure which must be carried out in a plurality of successive operating steps. Between steps, additional waiting time is required for the hardening of the grout material. None of the three filter devices described in the cited documents has particularly good pressure stability, which is particularly a requirement when carrying out back-rinsing to clean the filter surfaces.

EP 1442782 A1 describes a filter device with a plurality of tubular filter elements which are fabricated from an organic plastic material. These are combined and sealed off by casting.

The object of the present invention was to devise an inexpensive filter device which reliably provides the maximum absolute seal, high pressure stability, and good handling characteristics.

This object is achieved by a filter device with the features set forth in claim 1. Refinements of the invention are set forth in the dependent claims. Also, important features relating to the invention may be found in the description hereinbelow, and in the drawings.

Ceramic filter elements with filter elements are relatively costly to fabricate, due to the high energy consumption in the sintering; however, they have a long service life. The invention provides substantial reduction of the fabrication costs and operating costs, as well as long service life. This is achieved, firstly, in that there is a substantial reduction in the fabrication steps for the filter device, which is of modular construction. Secondly, in the event of a leak in a given filter element, it is not necessary to immediately replace the entire modular filter device; instead, the defective filter element can be individually removed from service, by removing the "end unit" component from the holding frame, whereupon the end faces of the filter elements will be accessible. Further, the pressure stability in the back-rinsing process is substantially increased, as a result of the inventive modular filter configuration and the novel sealing technology.

According to the invention, the filter device is comprised of a plurality of filter elements which are assembled together to form a unit referred to as a "membrane assembly", a holding frame, grout material for sealing the filter elements with respect to the holding frame, and an end unit which is a separate element from the holding frame and is first mounted at the time of mounting of the filter device to the holding frame. The holding frame and the end unit delimit a liquid collection chamber (which is also referred to as the "permeate collection chamber").

In the fabrication, a membrane assembly comprised of a plurality of filter elements is sealed into the holding frame. The membrane assembly has high stability, due to the grout material and the holding frame surrounding the grout material, and the individual filter elements become mounted in the holding frame in a fluid-tight manner and without a seal.

According to a first refinement, it is proposed that an end face of the holding frame is flushly disposed with the end surfaces of the filter elements, and the liquid collection chamber is formed in the end unit at least in some areas. Such a holding frame is a very simple piece and thus is economical to fabricate; moreover, the manner of sealing the filter elements in the frame is consequently simplified, and serves to minimize the amount of grout material needed. The end unit may be designed as a box which is open on one side, which is also easy to fabricate.

It is further proposed that the holding frame and/or the end unit is fabricated from plastic material, particularly cast material or injection molded material from a polymer mass or from a prepolymer. These materials are inexpensive, and they may also be employed for the grout material. This avoids a situation in which the individual elements have different thermal and/or chemical characteristics; accordingly, sealing deficiencies in operation are avoided. The polymer or prepolymer which is used for the holding frame or part of the holding frame is preferably a thermoplastic with a melting point greater than 80° C. Examples are: ABS, acetal, PPE resins (such as Noryl, provided by the firm SABIC Global Technologies), nylon, PEEK, PET, PPSU (such as Radel, provided by the firm Solvay), CPVC, PVC, PP, PE, PVDF, PTFE, PEI (such as Ultern, provided by the firm SABIC Global Technologies), and polysulfone. The grout material is preferably a duroplast, e.g. polyurethane or epoxide.

Also proposed, as an alternative, is that the holding frame and/or the end unit be comprised of metal material, particularly steel, stainless steel, or aluminum. These have good chemical resistance and strength, as well as durability.

According to another refinement, the filter elements advantageously are irreversibly bonded to the holding frame by the grout material. Thus, the grout material has a dual function, namely providing a seal between the filter element and the holding frame (without the need for an additional sealing element), and providing irreversible bonding of the filter element to the holding frame.

It is also possible for the end unit to be releasably connected to the holding frame. This enables access to the permeate channels in the filter elements, which channels can be sealed off in the event of defects in a given filter element. In this way it is not necessary to replace the entire filter device, but it can continue to be operated without problems, merely by eliminating [sic] the detective filter element. In this connection, it is possible to provide a recess on an inner side of the end unit and to provide seal means on the opposite side of the holding frame, for attachment purposes.

The holding frame and the end unit can thus be joined together releasably by screw means.

According to yet another refinement, at least one discharge connection is disposed on the end unit. This may be provided during fabrication, by forming means, or, e.g., may be attached by adhesion or screw means, as a separate nipple, in an opening in the end unit, or, alternatively, may simply be comprised of an opening in the end unit. In particular, the end face of the end unit is suitable for this purpose, because then one can orient the filter elements horizontally and/or vertically without difficulty.

It is also proposed that the end unit and/or the holding frame have a projection on an outer surface, which projection is complementary to a recess in an oppositely disposed outer surface. In this way, the filter elements can be easily combined in a stack, with the projections and recesses providing positioning which is firm and well defined.

Further, it is possible to provide a respective holding element on each of the two ends of each of the filter elements. Alternatively a holding element may be provided on only one end of each filter element, with the other end being closed off. The first solution is designated "cross flow", and the second solution is designated "dead end"; and each provides a suitable structure for the desired configuration.

According to still another refinement, the holding frame for each filter element has a separate receiving slot, in which slot the filter element undergoes sealing by pouring in of the grout material. Thereby the filter elements are fixed and sealed in the receiving slots, which are separated by linear prominences. This increases the stability of the entire assembly. The linear prominences also provide significant saving of the required grout material, and additionally serve as reliable spacers. Thus, one can fabricate and utilize filter elements even with the use of somewhat costly grout materials, for applications in the drinking water area or applications with somewhat abrasive filtration media, without a major increase in the cost of the overall filter element.

It is also conceivable for the holding frame to have at least one inner surface which faces a filter element or the filter elements, and which is contacted by the grout material, wherein further said surface is disposed in an incline with respect to a longitudinal axis of a filter element. With this arrangement, it is particularly advantageous if a width of an opening bounded by the inner surface increases with progression toward the end unit. This means that the existing space between the holding frame and the filter element is filled with the grout material in a wedge-shaped configuration. If pressure is then applied to the filter device from a permeate side (thus from the liquid collection chamber), oppositely to the filtration direction, for the purpose of back-rinsing, the grout material will be wedged against the holding frame. This will provide much greater pressure stability than possible with customary filter devices. It is also basically conceivable for the width to decrease with progression toward the end unit. It is further possible for one inner surface to have an inclination which is different from the inclination of another inner surface, with regard to both the angle of the inclination and the direction of the inclination. Also conceivable is to have different inclinations in a single inner surface, e.g. alternating different inclinations, some of which provide an increase in width with progression toward the end unit and some of which provide a decrease in width with progression toward the end unit.

Another possibility is for the holding frame to have at least one inner surface which faces a filter element or the filter elements, and which is contacted by the grout material, wherein further said surface has at least one tooth structure with the grout material, particularly at least one tooth-like recess and/or at least one tooth-like prominence. This provides additional toothed configuration, and increased stability.

In addition, the abovementioned inner surfaces of the holding frame may have an inwardly curved or outwardly curved configuration, and/or they may have additional tooth structures in suitable numbers and shapes, which extend from the holding frame into the grout material or from the grout material into the holding frame. It should be understood that any type of the inclination of the inner surface and/or of the curvature and/or of the tooth structures, may be provided not only on one or more inner sides of the holding frame but additionally or alternatively also on one or more inner sides of the individual linear prominences (if such linear prominences are present), for purposes of increasing stability; and further that all of the abovementioned measures for increasing stability may be combined in any desired manner. Thus, not only is the stability of the entire assembly of filter elements increased, but also the stability of each individual filter element.

It should be understood that the term "end unit" does not necessarily refer to a piece which is individually associated with each filter device or each holding frame. It is also possible, e.g., for a plurality of holding frames to be attached to a single end unit. The end unit may have a plate-like shape, or may be designed as part of a collecting device on which a plurality of filter devices are disposed, or the end unit may itself be formed by such a collecting device. Then the permeate collection chamber will be present, e.g., in the collecting device, and will provide a permeate collection chamber to which a plurality of filter devices are connected.

Exemplary embodiments of the invention are illustrated in the drawings, and will be described in more detail hereinbelow.

In all of the Figures, elements and regions which are functionally equivalent bear the same reference numerals.

Figure 1:
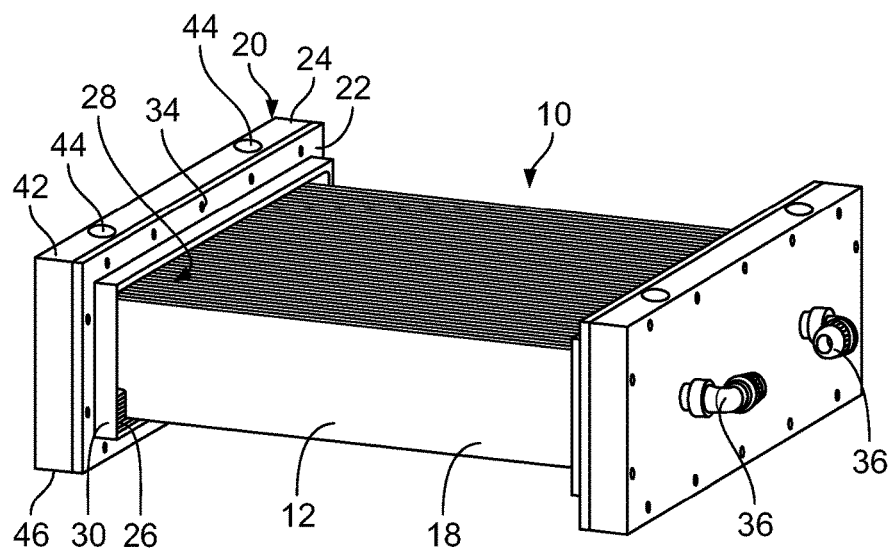
FIG. 1 is a perspective view of a first embodiment of a filter device.
Figure 2:
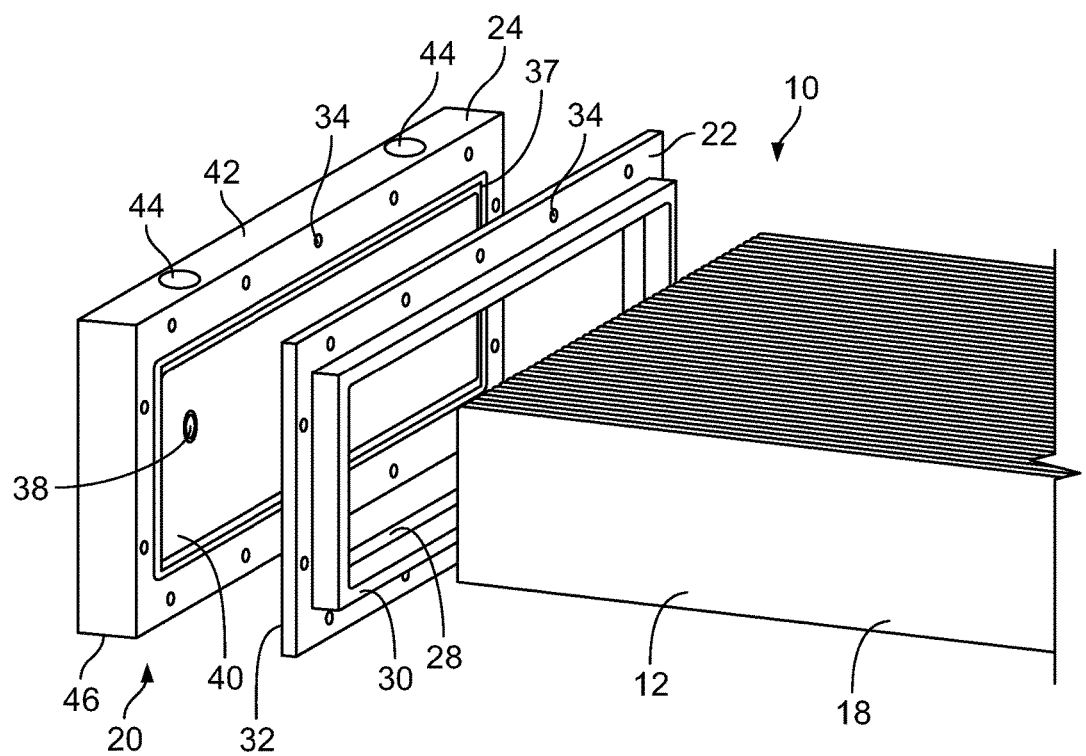
FIG. 2 is an exploded perspective view of the filter device according to FIG. 1.
Figure 3:
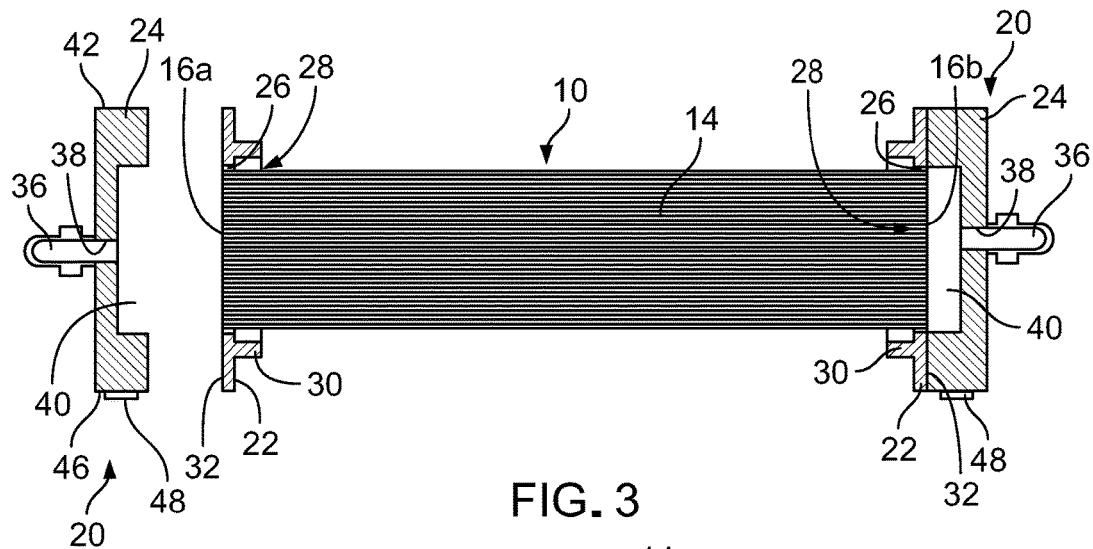
FIG. 3 is a lateral longitudinal cross section through the filter device according to FIG. 1.

In FIGS. 1 to 3, a first embodiment of a filter device is labeled with the overall reference numeral 10. It comprises a plurality (which might be called "an assembly") of plate-shaped filter elements 12 which are disposed parallelly. They are fabricated from a porous ceramic material, and each has in its interior a plurality of parallel channels 14 which extend over the entire length of the filter element 12, which open out in corresponding end faces 16a and 16b of a filter element (see FIGS. 3 and 4). The exterior side 18 of each filter element 12 is coated with a thin ceramic material (not shown) having a very fine pore width whereby it forms a "filtration membrane". This is referred to as "an exterior side having filter activity". The interiorly disposed channels 14 are discharge channels for the filtered liquid (which liquid is also referred to as "the permeate").

The filter device 10 is further comprised of a holding element 20 which has an overall rectangular shape. This element is essentially fabricated from a cast material or injection molded material from a polymer mass or from a liquid prepolymer, and has multiple parts: it is comprised of an overall rectangularly shaped holding frame 22, a rectangular end unit 24 which is plate-shaped or is configured as a box which is open on one side, and a grout material 26 (shown only in FIG. 1 and there only in a small region of its extent). Alternatively, the holding frame 22 and/or the end unit 24 may be fabricated from metal, particularly steel, stainless steel, or aluminum.

The holding frame 22 has a central rectangular opening 28 with width and height which are slightly greater than the corresponding width and height of the assembly of filter elements 12, and has an external collar 30 which extends around the opening 28. The filter elements 12 are sealed in, in the opening 28, by means of the grout material 26, whereby they are fixed in the opening, and thereby are fixed to the holding frame 22, in a liquid-tight and irreversible manner. It is understood that the openings of the channels 14 will remain free of the grout material 26 during this process. As may be seen in particular from FIG. 3, the end face 32 of the holding frame 22 is flush with the end surfaces 16 of the filter elements 12.

The end unit 24, which is produced as a separate piece, is releasably connected to the end face 32 of the holding frame 22 by screw means 34. The end unit 24 and holding frame 22 are thus of two-piece construction. A seal 37 is disposed between the holding frame 14 and the collection 16, in an accommodating groove (not bearing a reference numeral) formed in the end unit 24 which extends around the periphery. On the outer side of the end unit 24, two nipple-like discharge connections 36 are disposed, which are in fluid communication, via a thoroughgoing opening 38, with a liquid collection chamber 40 (the "permeate collection chamber"), provided between the holding frame 22 and the end unit 24. Corresponding liquid lines (not shown), through which the filtered liquid (permeate) may be passed for further use, may be connected to the discharge connections 36. It may be seen from FIG. 3 that the liquid collection chamber 40 is disposed completely in the end unit 24.

Two recesses 44 are provided on an upper outer surface 42 (FIGS. 1 to 3) of the end unit 24. Two projections 48 (shown only in FIG. 3) which are complementary to the recesses 44, and are disposed at corresponding locations, extend from a lower external surface 46 (FIGS. 1 to 3) of the end unit 24 which surface 46 is opposite to the external surface 42. This facilitates the stacking of a plurality of filter devices 10 on top of each other in the manner of building blocks, to form a stable filtration tower.

The filter device 10 is fabricated as follows: First, the filter elements 12 are assembled into a parallel assembly with the aid of an auxiliary device, such that a distance is provided between the outer surfaces of neighboring filter elements 12. The assembly is then inserted into the opening 28 in the holding frame 22. At this point, the holding frame 22 and the end surfaces 16 of the filter elements 12 lie evenly against a counter element, which is comprised of, e.g. silicone; preferably, the filter elements 12 are oriented with their longitudinal axes vertical, which the holding frame 22 disposed underneath. Then, from above, the grout material 26, still in liquid form, is poured into the gap between the holding frame 22 and the assembly of filter elements 12, and into the gaps between the filter elements 12; whereupon the grout material hardens. Then the end unit 24 is screwed onto this pre-fabricated unit comprised of the holding frame 22 and the filter elements 12.

It is seen from FIGS. 1 to 3 that a respective holding element 20 is provided at both ends of each the filter elements 12.

Figure 4:
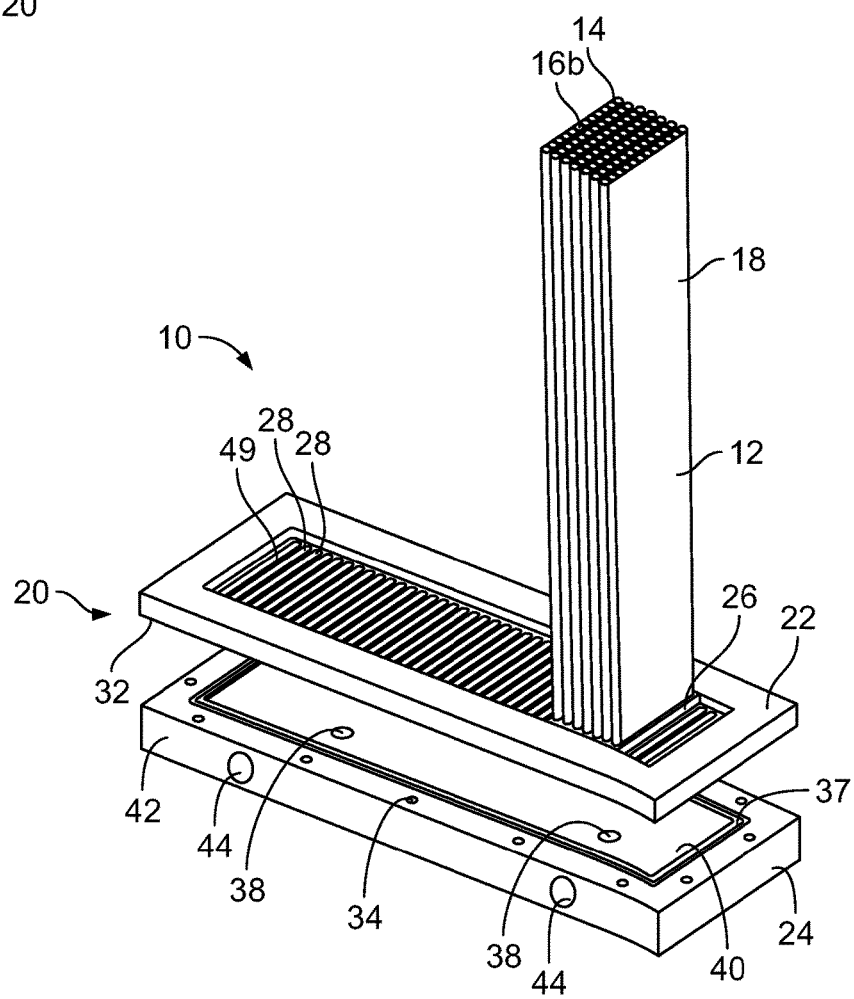
FIG. 4 is an exploded perspective view of a second embodiment of a filter device.

A second embodiment of the filter device 10 is illustrated in FIG. 4. This embodiment differs from the first embodiment firstly in the configuration of the holding frame 22. For the sake of additional stabilization of the individual filter elements 12, the holding frame 22 has a separate (individual) accommodating slot 28 for each filter element 12, with the filter element 12 being sealed into said slot in a fluid-tight and irreversible manner, by means of the grout material 26. A respective linear prominence 49 is disposed between neighboring accommodating slots 28. No collar configuration is provided, but optionally it is basically possible for a collar to be provided. Further, in the embodiment illustrated in FIG. 4, a holding element 20 is provided only at one end of the filter elements 12, with the other end (top of FIG. 4) being closed off; this is an optional feature.

Figure 5:
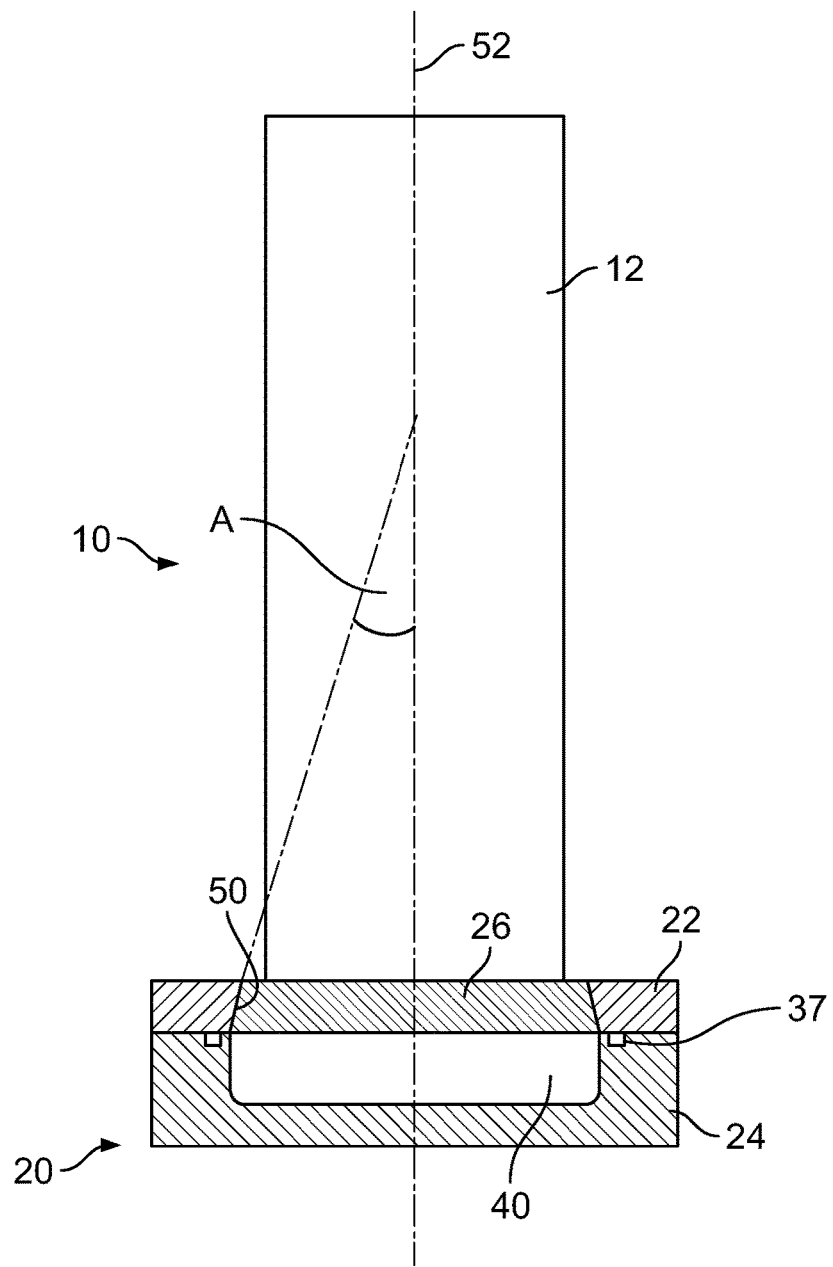
FIG. 5 is a partially schematic longitudinal cross section through a third embodiment of a filter device.

The third embodiment, illustrated in FIG. 5, is basically similar to that according to FIGS. 1 to 3. However, here the holding frame 22 has an inner surface 50 which is directed toward the filter elements 12 [sic] and is contacted by the grout material 26. The inner surface 50 is oriented at an angle $A$ with respect to a longitudinal axis 52 of the filter elements 12. Accordingly, a width of the opening 28 bounded by the inner surface 50 increases with progression toward the end unit 24.

Figure 6:
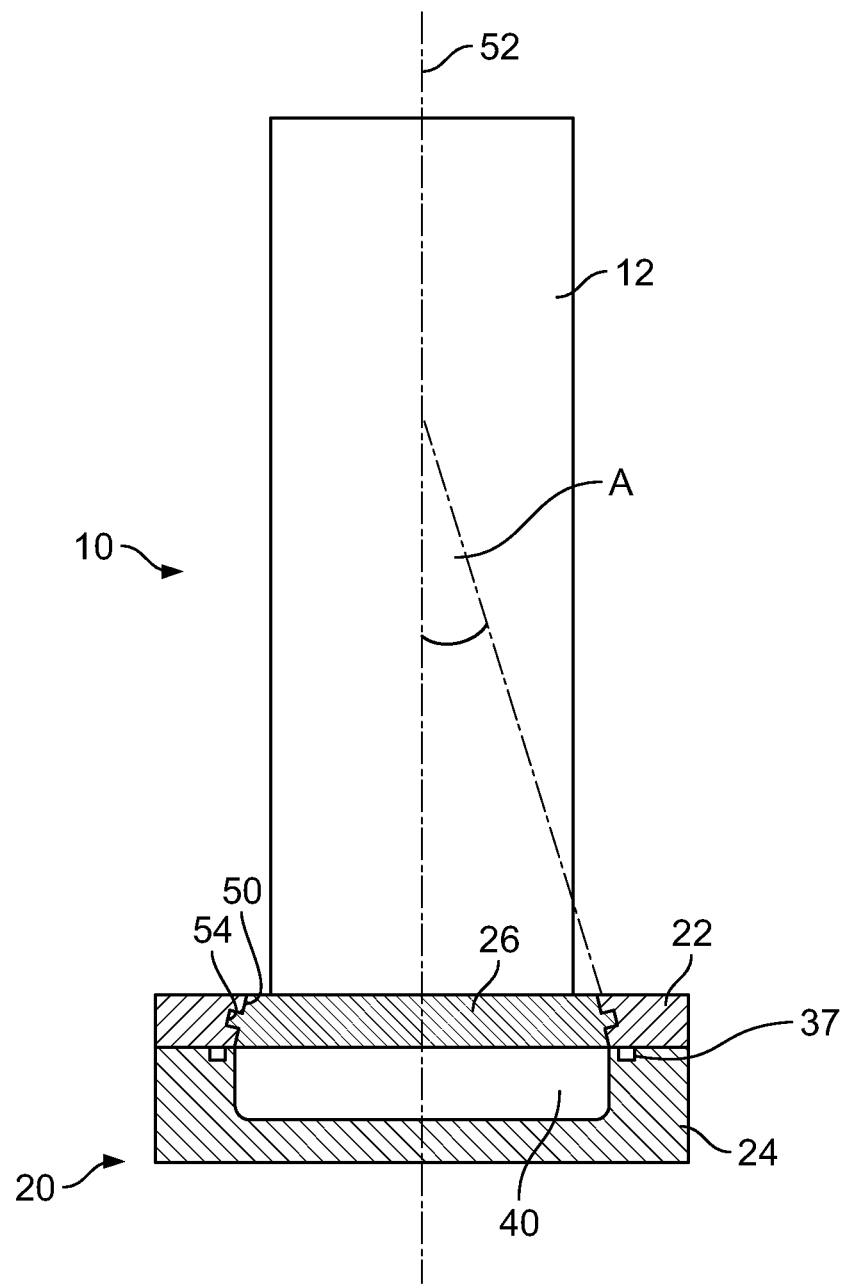
FIG. 6 is a view similar to FIG. 5, through a fourth embodiment of a filter device.

The fourth embodiment, illustrated in FIG. 6, is very similar to that according to FIG. 5. Here again the holding frame 22 has an inclined inner surface 50 which is directed toward the filter elements 12 and is contacted by the grout material 26. However, in addition a tooth structure is provided with the grout material 26, which structure is formed primarily by a recess 54 in the inner surface 50, wherewith grout material 26 flows into said recess. As seen from FIG. 7, a prominence 56 may also be provided, which is then surrounded by the grout material 26. It is possible to employ the tooth structure without the inclines. Also, the inner surface may be curved inwardly or outwardly.

Figure 8:
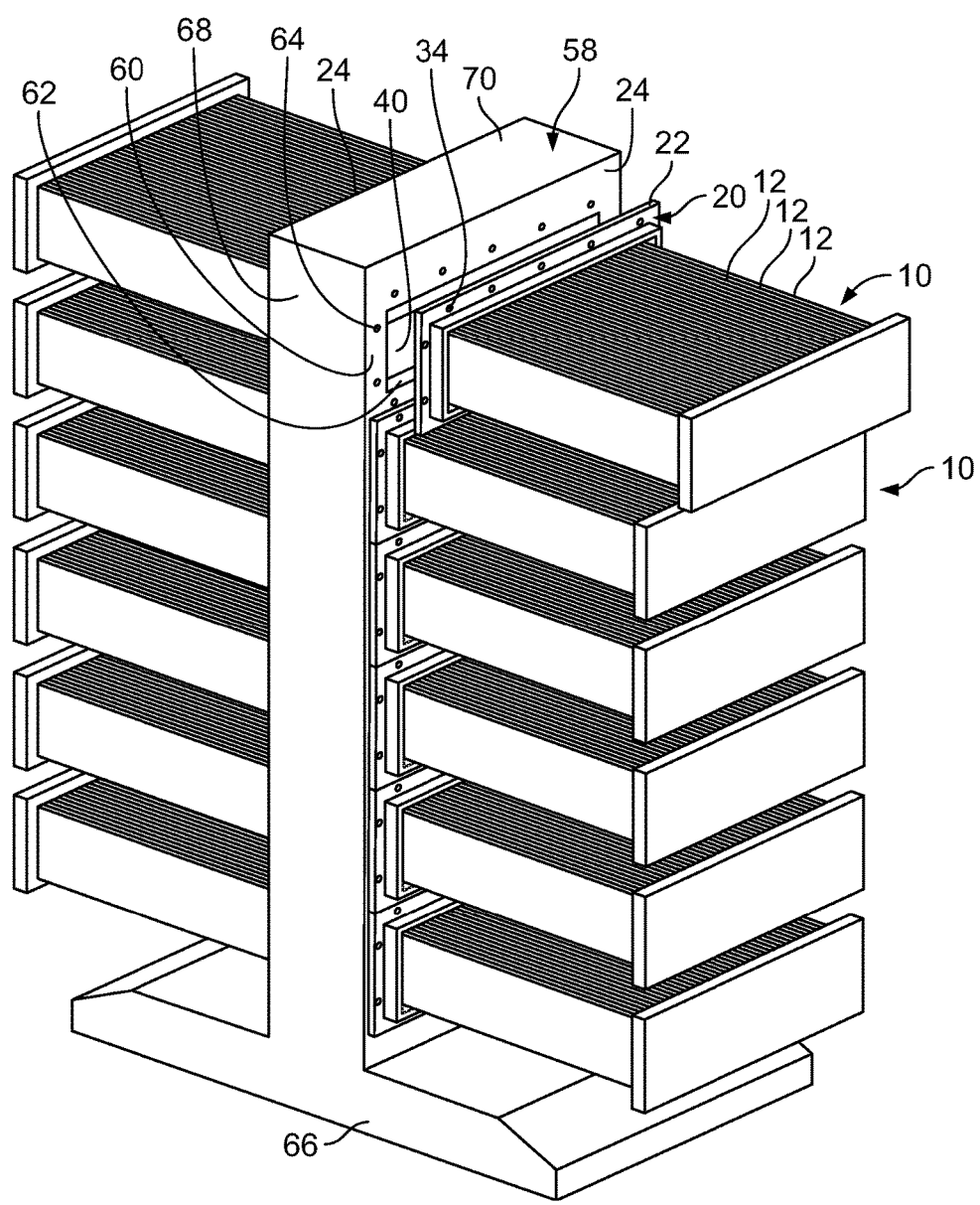
FIG. 8 is a perspective view of a tower-like collecting device having two end units for each of six filter elements.

In the embodiment according to FIG. 8, the so-called "end unit" 24 is not a separate piece which is associated with each filter device 10 or holding frame 22. Rather, a plurality of holding frames 22 (and thus a plurality of filter devices 10 with a plurality of filter elements 12) are attached to a single end unit 24. Thus this embodiment has a single holding element 20 with a plurality of holding frames 22 and a plurality of filter devices 10, having a plurality of filter elements 12. Each filter device 10 may correspond to a filter element illustrated in one of the earlier Figures.

The end unit 24 is designed as a part of a tower-like collecting device 58, with a front wall 60 facing the observer in FIG. 8 and a rear wall facing away from the observer in FIG. 8. The collecting device 58 thus advantageously has, e.g., two end units 24. The uppermost filter device 10 (FIG. 8), which for purposes of simplicity of illustration is the only filter device provided with reference numerals, has a rectangular opening 62 in the visible front wall 60, with a plurality of screw holes 64 disposed around the periphery of said opening, for attaching to the holding frame 22 in conjunction with appropriate screw means 34.

The front wall 60 has a total of six such openings 62 with corresponding screw holes 64, allowing mounting of six filter devices 10 there, disposed in a vertical array. The same applies for the rear wall of the collecting device 58. It should be understood that in other variant embodiments (not shown), appreciably more than six filter devices may be present, and these may be arranged not only in vertical succession but also (or alternatively) in a horizontal array.

The permeate collection chamber 40 is present in the interior of the collecting device 58. It is thus bounded by the interior side of the front wall 60, the edge of the opening 62, the grout material 26, and possibly also by the inner edge of the holding frame 22 of a filter device 10, as well as additionally by an inner side of the rear wall, side walls 68, a cover wall 70, and a bottom. According to a variant embodiment, the permeate collection chamber is partially in the form of a separate area, e.g. a collecting channel in the collecting device, wherewith corresponding discharge channels lead from that channel to the individual filter devices. In the sense of the present description, these discharge channels also are part of the boundary of the permeate collection chamber.

For the purpose of facilitating discharge of the filtered fluid, an underpressure source may be connected to the permeate collection chamber 40. The collecting device 58 illustrated in FIG. 8 is vertically oriented. For this purpose, it has a stand 66. The advantage of such a tower-like collecting device 58 is compact construction and high filtration throughput.

Figure 7:
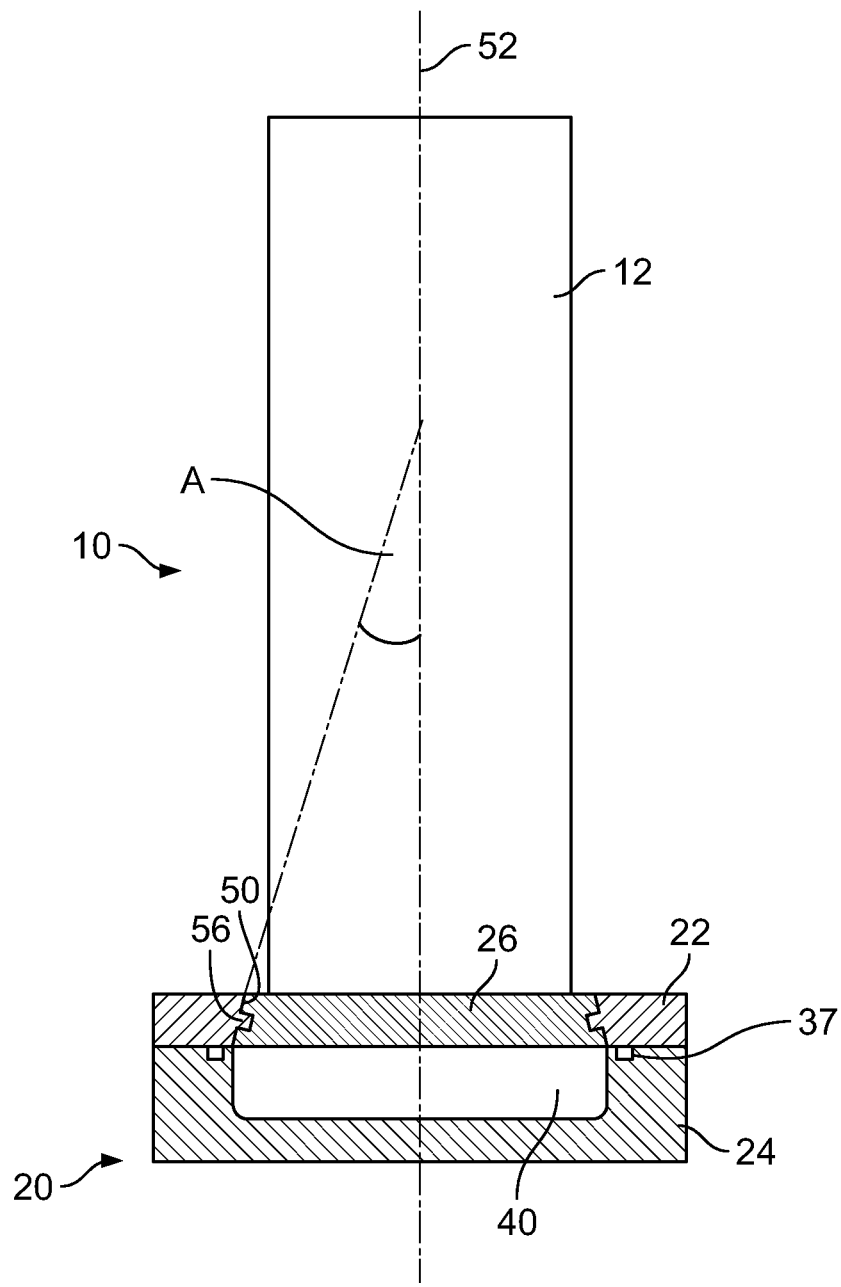
FIG. 7 is a view similar to FIG. 6, through a fifth embodiment of a filter device.

It should be understood that the variants according to FIGS. 5, 6, and 7 in particular may be combined individually and in any combinations. Fundamentally also the features of the embodiments according to FIGS. 5, 6, and 7 are also usable in the holding frame 22 according to FIGS. 1 to 4, and, with regard to FIG. 4, in the slots 28.

The invention claimed is:

1. A filter unit for water filtration, comprising:
    at least two ceramic filter membranes;
    at least one holding member for the at least two ceramic filter membranes, wherein the at least two ceramic filter membranes are shaped like plates and the membranes are parallel to each other, the at least two ceramic filter membranes have a filter-active outside and at least one inside removal conduit for filtered water;
    the at least one holding member includes a frame;
    the at least one holding member includes a collection chamber via which water exiting out of the at least one inside removal conduit can be removed;
    the at least one holding member includes an end unit,
    wherein the end unit is coupled with an outer portion of the frame, the at least two ceramic filter membranes are coupled with the frame, and the at least one inside removal conduit is communicatively connected with the collection chamber, and
    wherein the frame includes an inner surface non-parallel relative to a longitudinal axis of the ceramic membrane, where a width of an opening of inner surface increases toward the end unit.

2. The filter unit for water filtration as recited in claim 1, further comprising a grout material disposed between the at least two ceramic filter membranes and the holding member.

3. The filter unit for water filtration as recited in claim 1, wherein the end unit is directly coupled with an outer surface of the frame.

4. The filter unit for water filtration as recited in claim 3, further comprising a grout material disposed between the at least two ceramic filter membranes and the holding member.

5. The filter unit for water filtration as recited in claim 1, wherein the end unit further includes at least one water exit.

6. The filter unit for water filtration as recited in claim 5, further comprising a grout material disposed between the at least two ceramic filter membranes and the holding member.

7. The filter unit for water filtration as recited in claim 1, wherein the end unit includes one or more recesses configured to receive a projection.

8. The filter unit for water filtration as recited in claim 7, further comprising a grout material disposed between the at least two ceramic filter membranes and the holding member.

9. The filter unit for water filtration as recited in claim 1, wherein at least one of the following holds:
    the end unit or comprises plastic; and
    the frame comprises plastic.

10. The filter unit for water filtration as recited in claim 1, wherein at least one of the following holds:
    the end unit or comprises steel; and
    the frame comprises steel.

11. The filter unit for water filtration as recited in claim 1, further comprising two holding members, each holding member disposed at each end of the ceramic filter.

12. The filter unit for water filtration as recited in claim 1, wherein the collection chamber is within the end unit.

13. The filter unit for water filtration as recited in claim 1, wherein the frame includes separate admission slots for each individual membrane.

14. The filter unit for water filtration as recited in claim 13, further comprising at least one crossbar within the frame, and adjacent crossbars form the separate admission slots.

15. The filter unit for water filtration as recited in claim 1, further comprising a recess within the inner surface.

16. The filter unit for water filtration as recited in claim 15, further comprising a grout material disposed within the recess.

17. The filter unit for water filtration as recited in claim 16, further comprising a grout material disposed between the at least two ceramic filter membranes and the holding member.

18. The filter unit for water filtration as recited in claim 15, further comprising a grout material disposed between the at least two ceramic filter membranes and the holding member.

19. The filter unit for water filtration as recited in claim 1, wherein the end unit comprises plastic, and the frame comprises plastic.

20. The filter unit for water filtration as recited in claim 1, wherein the end unit comprises steel, and the frame comprises steel.

* * * * *

UNITED STATES PATENT AND TRADEMARK OFFICE
CERTIFICATE OF CORRECTION

PATENT NO. : 10,427,105 B2
APPLICATION NO. : 15/511574
DATED : October 1, 2019
INVENTOR(S) : Thomas Blanke et al.

Page 1 of 1

It is certified that error appears in the above-identified patent and that said Letters Patent is hereby corrected as shown below:

In the Claims

Column 8, Line 21, Claim 9, after "unit" delete "or"

Column 8, Line 25, Claim 10, after "unit" delete "or"

Signed and Sealed this
Twenty-fourth Day of March, 2020

Andrei Iancu
*Director of the United States Patent and Trademark Office*